Nov. 5, 1929.   A. MOORHOUSE   1,734,266
MOTOR VEHICLE
Filed March 1, 1922
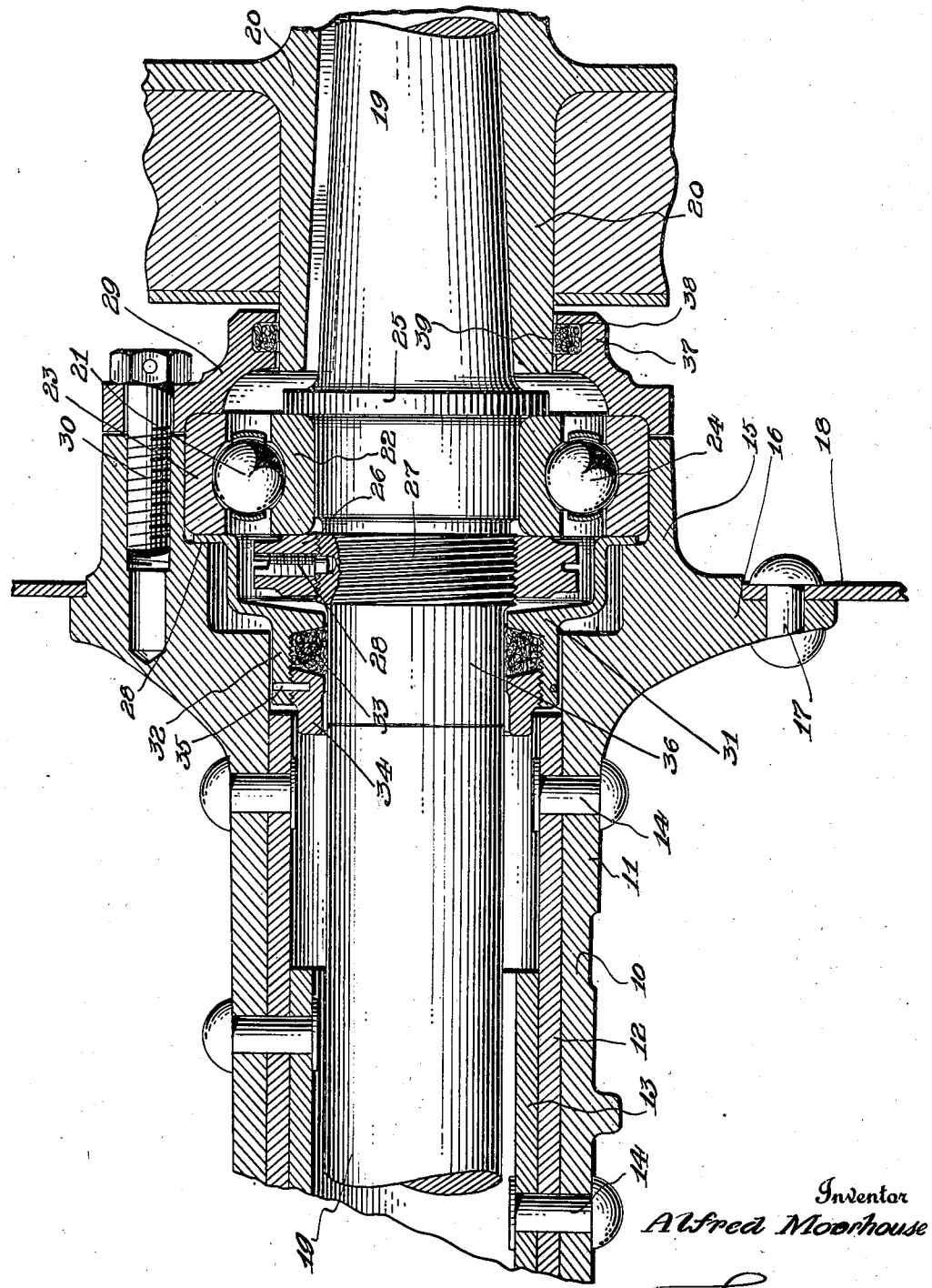
Inventor
Alfred Moorhouse
By Milton Sibbetts
Attorney Patented Nov. 5, 1929

1,734,266

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 1, 1922. Serial No. 540,187.

This invention relates to motor vehicles and particularly to motor vehicle axles.

One of the objects of the invention is to provide novel bearing and packing devices for the axle shaft.

Another object of the invention is to provide a packing device for the axle shaft that may be removed with the shaft to thereby better preserve the packing.

Another object of the invention is to provide a motor vehicle axle with efficient packing means adjacent its outer end to prevent the escape of lubricant from the axle.

Other objects of the invention will appear from the following description taken in connection with the drawing, which forms a part of this specification, and in which the figure is a longitudinal section through the outer end of a motor vehicle axle made in accordance with this invention.

Referring to the drawing 10 represents generally the outer end of a motor vehicle axle tube, the parts that go to make up this tube being indicated at 11, 12 and 13, 11 being a drop forged piece secured as by rivets 14 to the tube 12, and 13 being a reinforcing tube, some of the rivets 14 passing through both tubes and the piece 11. The outer end of the axle tube, that is the outer part of the piece 11, is somewhat enlarged as at 15 and is formed with an annular flange 16 to which is secured, as by rivets 17, a brake supporting plate 18, the brake and its parts not being shown in the drawing.

Within the axle tube is a shaft 19 which may be called the axle shaft or section, and it will be understood that in the axle there are two of these shafts which are connected at the middle of the axle by differential gearing. This axle shaft is adapted to be withdrawn endwise from the axle by reason of its splined connection to the differential gears at the inner end. This construction is usual and is therefore not shown.

Upon the outer end of the shaft 19 is part of a wheel hub 20 which may be keyed or otherwise secured to the shaft in any suitable manner, the hub part thereby forming a part of the shaft so far as the operation of the two parts together is concerned.

The axle shaft is supported in the axle tube at the outer end of the latter by a bearing 21 which is shown in the form of a roller or ball bearing, the term roller bearing including both cylindrical rollers and spherical balls. This bearing consists of inner and outer races 22 and 23 respectively and a series of rollers or balls 24 between them. The inner race 22 of the bearing is clamped or secured to the shaft 19 between a flange 25 thereon and a threaded nut 26, the nut being threaded to the shaft 19 as shown at 27. A small locking bolt 28 secured the nut 26 against turning after it is tightened up on the shaft.

The outer race 23 of the roller bearing is clamped or secured to the axle tube between a shoulder 28' in the enlarged part 15 of the tube and a clamping ring 29 which is bolted to the outer end of the axle tube as by a series of bolts 30 which are threaded into the tube.

By this arrangement it will be seen that the axle shaft 19 is retained against endwise movement by the clamping ring 29 and the bearing 21 and upon removal of that ring the axle shaft and the bearing 21 may be outwardly withdrawn endwise. By this arrangement also it is seen that the bearing 21 is at the extreme outer end of the axle tube so that it is just as near as possible to the wheel and consequently the bending stress on the axle shaft is less than it would be if the bearing were arranged further inwardly. In fact the bearing is so far out that there is practically only a shearing stress on the axle shaft.

One of the difficulties with axles of this general character is the leakage of lubricant from the middle part of the axle to the outer ends where it escapes to the wheels and the brake drums. In the present invention provision is made for preventing the escape of lubricant outwardly along the axle and means are provided also for retaining lubricant in the space surrounding the shaft bearing 21.

Inwardly of the bearing 21 is a packing device 31 which is somewhat cup-shaped as shown and which is adapted to be clamped to the axle tube between the outer bearing race 23 and the shoulder 28' above referred to.

This device is slightly smaller in circumference than the periphery of the race 23 so that the device may find its radial seat on the axle shaft rather than in the outer end of the axle tube, as will hereinafter appear.

The packing device 31 has a hub part 32 which fits within the smaller diameter of the piece 11 with some clearance so that there is no contact between these parts. This hub part has suitable packing material 33 within it and a packing pressing device or nut 34 threads into the hub part 32 and retains the packing material 33 therein. A locking ring 35 surrounds the hub part and its end extends into the nut 34 to retain the latter against accidental displacement.

The part 36 of the shaft 19 which is inside of the hub part 32 of the packing device is preferably ground so that there is a smooth running fit between this surface and the packing material 33 and in this manner the packing effectually prevents the passage of any lubricant from the middle part of the axle tube to the space surrounding the bearing 21. The clamping ring 29 above referred to is also a packing ring in that it has a flange 37 with a recess 38 in which is packing material 39 surrounding the axle shaft 19 just outwardly of the flange 25. As shown the packing material 39 is in direct contact with the hub part 20 above referred to.

From the above it will be seen that there are packing devices on both sides of the bearing 21 and both of these packing devices and the outer race of the bearing 21 are clamped to the axle tube by the bolts 30. Upon removing the bolts the axle shaft, the bearing, the clamping ring 29, and the packing device 31 will all come out together. In assembling, it is obvious that the packing device 31 will be assembled on the axle shaft in the position in which it is shown on the drawing be- before the axle shaft is put in the axle tube. Also, when the axle shaft is removed the packing device will come with it and the packing material 33 is not disturbed by the removal of the axle shaft as would be the case if the packing device remained in the axle tube when the shaft was removed.

It will be further understood that the space between the two packing devices, that is the space adjacent the bearing 21, will not receive lubricant from the middle part of the axle tube and must therefore be provided with grease either by packing it with grease originally or by a separate grease cup which may be supplied if desired. Dirt is excluded from this space by the outer packing device.

It will be understood that various forms of the invention other than those described above may be used without departing from the spirit or scope of the invention.

Having thus described my invention, what I claim and desire to secure by Letters Patent is:

1. In a motor vehicle axle, the combination with the axle tube and the axle shaft therein, of a bearing for the shaft in the tube, and a packing device between the tube and the shaft withdrawable with the axle shaft.

2. In a motor vehicle axle, the combination with the axle tube and the axle shaft therein, of a bearing for the shaft in the tube, and a packing device inwardly of the bearing and withdrawable with the axle shaft.

3. In a motor vehicle axle, the combination with the axle tube and the axle shaft therein, of a bearing for the shaft in the tube, means for clamping the bearing in the tube, and a packing device clamped with the bearing and withdrawable with the axle shaft.

4. In a motor vehicle axle, the combination with the axle tube and the axle shaft therein, of a bearing for the shaft in the tube, means for clamping the bearing in the tube, and a packing device clamped between the bearing and the tube.

5. In a motor vehicle axle, the combination with the axle tube and the axle shaft therein, of a bearing for the shaft in the tube, means for clamping the bearing in the tube, and a packing device between the tube and the axle inwardly of the bearing and clamped to the tube.

6. In a motor vehicle axle, the combination with the axle tube and the axle shaft therein, of a bearing for the shaft at the extreme outer end of the tube, a clamping ring at the end of the tube for retaining the bearing therein, said shaft having a flange against which the outer face of the bearing abuts, means on the shaft for retaining the bearing against said flange, and a packing device inwardly of said means and secured to said tube.

7. In a motor vehicle axle, the combination with the axle tube and the shaft therein, of a roller bearing having its inner ring clamped to the shaft and its outer ring clamped to the tube, and a packing device clamped to the tube with the outer bearing ring.

8. In a motor vehicle axle, the combination with the axle tube and the shaft therein, of a roller bearing having its inner ring clamped to the shaft and its outer ring clamped to the tube, and a packing device clamped to the tube with the outer bearing ring and removable with the shaft.

9. In a motor vehicle axle, the combination with the axle tube and the shaft therein, of a bearing for the shaft clamped to the tube, means inwardly of the bearing for securing a bearing part to the shaft, a cupped packing ring surrounding said means and secured to the tube, and a packing pressing device on said ring.

10. In a motor vehicle axle, the combination with the axle tube and the axle shaft therein, of a roller bearing for the shaft at the end of the tube, packing devices between the tube and shaft at both sides of the bearing, and means for simultaneously clamping both said devices to the tube.

11. In a motor vehicle axle, the combination with the axle tube and the axle shaft therein, of a roller bearing for the shaft at the end of the tube, packing devices between the tube and shaft at both sides of the bearing, and means for clamping the bearing and both said devices to the tube.

12. In a vehicle axle, the combination of an axle tube, an axle shaft therein, a bearing for the shaft at the end of the tube, said shaft having a flange against which the outer face of the bearing abuts, means on the shaft for retaining the bearing against said flange, a clamping ring at the end of the tube for retaining the bearing therein, and a packing device between the axle and tube inwardly of said means.

13. In a vehicle axle, the combination of an axle tube, an axle shaft therein, a bearing for the shaft at the end of the tube, said shaft having a flange against which the outer face of the bearing abuts, means on the shaft for retaining the bearing against said flange, a clamping ring at the end of the tube for retaining the bearing therein, a packing device between the axle and tube inwardly of said means, and a packing device surrounding the axle shaft outwardly of the bearing.

14. In a vehicle axle, the combination of an axle tube, an axle shaft therein, a roller bearing having its inner ring clamped to the shaft and its outer ring clamped to the tube, and a packing device surrounding and centered upon the shaft inwardly of the bearing and adapted to fit loosely within the axle tube, said device being clamped to the tube with the outer bearing ring.

In testimony whereof I affix my signature.

ALFRED MOORHOUSE.